United States Patent Office 2,708,199
Patented May 10, 1955

2,708,199

PREPARATION OF ORGANIC POLYSULFIDES

Harold H. Eby, Ponca City, Okla., assignor to Continental Oil Company, Ponca City, Okla., a corporation of Delaware No Drawing. Application October 24, 1951,
Serial No. 252,995

13 Claims. (Cl. 260—327)

This invention is concerned with an improved conversion of olefins to substantially saturated oil-soluble sulfur containing compounds.

More particularly, this invention relates to producing organic polysulfide compounds consisting essentially of carbon, hydrogen, and sulfur containing not less than 12 carbon atoms, wherein the carbon and hydrogen are present as substantially saturated radicals resulting from reacting olefins with inorganic sulfur compounds. The desired products of this invention contain two hydrocarbon radicals joined by sulfur of which there will be not less than 4 nor more than about 6 atoms.

The prior art has dealt with the present subject. However, the methods disclosed have not succeeded in producing the compounds which I secure in accordance with my invention. Although the prior art discloses oil soluble products by the reaction of olefins with a sulfur halide and by the stabilization thereof with inorganic sulfides, in no instance have products been produced which have a low degree of unsaturation and which are substantially free of halogen by sulfur replacement. These prior art products contain appreciable amounts of halogen and/or are deficient in sulfur to the extent that the proportion thereof is substantially less than 2 gram atoms per mole of combined olefin. Furthermore, such products generally consist of a mixture of varying molecular structures. Of the prior art compounds which are low in chlorine, these are usually deficient in sulfur and contain appreciable amounts of carbon unsaturation. This has been true particularly for products from the higher olefins especially of branched structure. Prior workers have failed to provide the proper reaction conditions for the olefin-sulfur halide reaction and for the subsequent treatment of this preliminary reaction product which I have discovered for getting substantially saturated products high in purity and homogeneity.

An object of this invention is to provide an improved conversion of olefinic hydrocarbons to sulfur-containing compounds where the olefin contributes the substituent hydrocarbon radical without appreciable alteration of its structure and compositions. Another object is to produce compounds from olefins which are essentially saturated with sulfur, wherein two olefin-derived hydrocarbon radicals are linked together by this sulfur.

The high sulfur combined with hydrocarbon groupings, produced according to this invention, form a class of compounds which are useful for many purposes, e. g., as highly effective extreme pressure agents in both non-aqueous and emulsion types of cutting compositions; they may be used as plasticizers and in some instances as sulfur carriers in the compounding of elastomeric compositions; other applications include use as fixatives in industrial perfumery.

Broadly stated, my invention for producing saturated oil soluble organic polysulfides comprises the steps, reacting a non-conjugated olefinic hydrocarbon having from at least six to about 30 carbon atoms with about a stoichiometric equivalent of a sulfur halide at a temperature of from about 0° C. to about 50° C. for a time sufficient to form a di(halo alkyl) sulfur intermediate, but insufficient to effect dehydrohalogenation as evidenced by the substantial splitting out of hydrogen halide, then at once condensing this intermediate with a water-soluble inorganic higher polysulfide at about 50–100° C., in a mutual solvent, for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin. For the purposes of this specification and the appended claims, the term "dimer" is used in the sense that two molecules of the reactant olefin are joined together by sulfur bridging.

To produce sulfur-containing compounds having desirable solubility characteristics, I employ olefinic hydrocarbons containing at least 6 to about 30 carbon atoms. Straight and branched chain olefins, i. e., acyclic olefins generally are preferred. Cyclic olefins, although not fully equivalent, may be used to produce products which have solubility characteristics in the sense of being more or less readily dispersible for some purposes. The olefins which I may employ are commercially produced in many ways, for example by the dehydration of alcohols such as the $C_6$ and higher alcohols; from the cracking of hydrocarbon oils; from the polymerization of light olefins such as propylene, butylene, and amylene; or by chlorination-dehydrochlorination of saturated hydrocarbons. The olefin charge to the process may consist of a wide boiling mixture of olefins, or be a narrow boiling fraction thereof, or be a single pure olefin. However, my preference is first for narrow-cut olefin fractions, and second for pure olefin species. Ordinarily I avoid olefin materials contaminated with saturated hydrocarbons, especially so among the high boiling olefins since such contaminants, although inert in the process, become diluents of my final products and cannot be readily separated therefrom. My raw material is usually mono-olefinic; however, non-conjugated diolefins above about $C_{15}$ may also be used.

Specific examples of olefin contemplated in the foregoing description are the propylene polymers such as hexene, nonene, dodecene, octadecylene, etc., tri-isobutylene, 2 ethylhexene-1, octene-1, dodecene-1, wax-olefin, and the like. For dispersible rather than soluble types of products, examples of olefins applicable are methyl cyclopentene, cyclohexene, and pinene.

I have also found that the chloroalkylsulfides produced by addition of a sulfur halide to an olefin can be dehydrochlorinated to form unsaturated organic sulfides which are also useful raw materials in the practice of my invention. These unsaturated or olefinic sulfides are produced by reacting an olefin-sulfur chloride addition product with an aqueous-alcoholic solution of either potassium hydroxide or sodium monosulfide, or the like alkaline material, at about 80° C for 1 to 3 hours. Thus treated, the addition product evolves substantially all of its chlorine and an equivalent amount of hydrogen to form the corresponding unsaturated organic sulfide. This material may be used as a reactant olefin starting material in my process to produce desirable and useful oil soluble saturated organic sulfides.

With increasing branching of the olefin structure, the tendency of the olefin to form unstable products and to undergo side reactions with the sulfur halide also increases. Herein lies one of the advantages of my process; the combination of conditions which I have discovered will care for the processing of all of the described olefins with almost equal facility in producing clean-cut products.

The first part of my process is concerned with reacting an olefin with a sulfur halide, preferably the sulfur chlorides and ordinarily of these I use sulfur monochloride. Reaction-wise, the two chlorides are substantially equivalent. Chemically, however, the monochloride produces final products containing the greater amount of sulfur, although in many instances the dichloride appears to be substantially equivalent to the monochloride by reason of conditions existing in the second part of my process.

The product of this first reaction is a di-(chloro alkyl) sulfide produced by the addition of the elements of the sulfur chloride to the unsaturated carbon atoms of the olefin. However, this addition reaction is complicated by the ease with which hydrogen chloride is split from the product. Further complications consist in side reactions to form unsaturated, resinous and dark contaminants. Finally, the addition products generally do not possess sufficient stability for purification to remove contaminants, for example, attempts at distillation will destroy it; even water washing is detrimental. I have found that optimum conditions for the preperation of the intermediate include the following:

1. The presence of a stabilizing agent or catalyst premixed with the olefin.
2. The addition of this olefin-catalyst mixture to the sulfur halide at a rate in keeping with control of the reaction temperature.
3. Maintaining the temperature of the reaction below about 50° C.
4. Using an amount of sulfur halide equal to about 0.5 molecule for each double bond in the reactant olefin.

While the conditions just enumerated are optimum, useful products may be prepared without observing all of such conditions.

The catalysts or reaction promoters which I have found to be useful in the first step of my process include the lower aliphatic alcohols, such as methyl-, ethyl-, and propyl alcohol. Of these, I prefer ethyl alcohol and I have found the commercial denatured varieties such as Formulas 12 and 30 are satisfactory; the presence of the denaturant and small amounts of water therein are not detrimental. I employ minor amounts of the alcohol not to exceed 10 per cent of the olefin used and preferably it is about 3–5 per cent. The alcohol should first be intimately mixed with the olefin and then the mixture reacted with the sulfur halide; it is ineffective if mixed with the sulfur halide. Among the benefits of the use of this catalyst are marked decrease in hydrogen halide evolution and unreacted components remaining. The stabilizing or catalytic effect of the alcohol produces an addition product containing only insignificant amounts of side reaction contaminants; the color of the product is very much lighter than in the absence of the catalyst. The reaction between an olefin and sulfur halide is normally characterized by an induction delay wherein no reaction will be apparent until as much as about a half of the olefin has been mixed with the halide; unwanted side reactions have been attributed to such induction delay. This induction period is substantially eliminated by the presence of the alcohol.

It is preferred to add the olefin to the halide rather than the reverse, to produce a more complete reaction, a minimum hydrogen halide split-out, and a brighter looking product.

The temperature for the olefin-sulfur halide reaction should not exceed about 50° C. Higher temperatures produce increasing side and secondary reactions, the principal one of which is dehydrohalogenation producing halogen deficient products which are of little value in the second step of my process. For example, a temperature of the order of 100° C. or more produces a product containing 20 per cent or less of the halogen content which is obtained at reaction temperatures not exceeding 50° C. Since the second step of my process involves replacement of the organic halogen substituents with sulfur, it is necessary in the first step that a reaction temperature sufficiently low for substantial retention of the halogen, preferably at about 20–30° C., be employed. Atmospheric pressures are used.

The olefin should be added to the reaction mixture at a rate to permit controlling the temperature in the desired range. The rate of olefin flow, therefore, is primarily determined by the cooling efficiency attainable with a given reactor. It is desirable to make the processing time as short as possible to avoid time-deterioration of products which tend to be unstable. With the facilities at my disposal, I have found that a processing time up to about 3 hours has been satisfactory, although I prefer to stay under 2 hours. Thorough agitation during the reaction is desirable.

The stoichiometry of the foregoing reaction may be represented by the following equation wherein an olefin hydrocarbon generalized by $RCH=CHR$ is reacted with sulfur monochloride, the preferred halide,

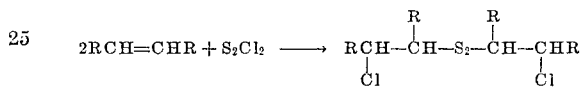

A slight excess above the molecular proportion of sulfur chloride shown here may be used when a catalyst is employed.

The foregoing description has dealt fully with the preparation of the chloroalkylsulfide intermediate required in my process. In all cases, this intermediate must be immediately consumed in the process for best results. It is, therefore, freshly prepared and rapidly used without further treatment since it is not sufficiently stable otherwise. This instability is shown by the readiness with which hydrogen halide splits out therefrom; appreciable losses of the substituent halogen is detrimental to subsequent processing for securing the desired products of this invention.

The second part of my process is characterized as a condensation reaction whereby the halogen substituent of the intermediate described above is replaced by sulfur. This condensation involves a reaction of the intermediate with an inorganic higher polysulfide.

The preferred conditions for the condensation reaction are as follows:

1. The condensing reagent is a water soluble inorganic higher polysulfide. Examples of these are the alkali and alkaline earth metal polysulfide, such as the polysulfides of Na, K, $NH_4+$, Ba, and the like. I prefer the polysulfides of sodium as represented by $Na_2S_x$, wherein $x$ must be at least 3 corresponding to a trisulfide. I prefer, however, to use a tetrasulfide of sodium, since it contains a greater amount of sulfur and is readily available commercially as a 40 per cent aqueous solution. The amount required of the reagent is at least equivalent to the halogen present in the intermediate, or based upon the olefin-raw materials, amounts to not less than one mole for every two moles of double bonds reacted. An excess of about 0.1 mole is usually used.

2. To be effective, the condensation reaction requires the presence of a mutual solvent. Examples are aqueous solutions or organic oxygen compounds, particularly the organic hydroxy compounds and more especially the alcohols such as ethyl and methyl alcohols. Ethylene and propylene glycols and glycerine may also be used. I prefer ethyl alcohol and the denatured forms of it such as Formulas 12 and 30 are satisfactory. When the organic solvent is absent from the reaction, the replacement of halogen from the intermediate by sulfur is so incomplete as to leave about 25 per cent of the halogen in the final product. I have found that the halogen is not only reduced to trace amounts in the final product, but that it is substantially replaced by sulfur when the condensation reaction contains alcohol or a like solvent usually in the proportion of about 1.25 volumes alcohol and one volume water. The proportion of alcohol per volume of water may vary from at least about 0.6 to 2 or more volumes of the alcohol.

3. The temperature of the condensation reaction must be at least about 50° C., otherwise the halogen substituent will not be effectively replaced by sulfur. I prefer to heat the mixture at a higher temperature, usually at its reflux boiling point which is about 80° C. In some instances mild pressures are applied to the reaction mixtures when temperatures to about 100° C. are needed.

The second part of my process embodying the foregoing requirements for the condensation reaction consists in the following exemplary procedure. An aqueous solution containing say 40 per cent of $Na_2S_4$ by weight is poured into a quantity of a freshly prepared olefin-$S_2Cl_2$ intermediate; the amount of $Na_2S_4$ present will be in slight excess, say about 0.55 gram moles per gram atoms of chlorine in the intermediate. Then the alcohol or like solvent is poured in; its amount will be not less than about 0.6 volume for each volume of water present in the reaction mixture. As an equivalent alternative, an aqueous alcoholic solution of the sodium polysulfide, separately prepared, may be added to the intermediate. When the reaction mixture thus formed is heated, usually under reflux boiling (around 80° C.) the desired product is formed upon the completion of the condensation reaction. Depending upon the olefin-sulfur halide intermediate, this reaction is completed in about ¼ to 5 hours, usually, however, about 1–3 hours is sufficient. Completion of the reaction is evidenced by reduction of organically combined chlorine to less than 1 per cent.

The organic product of the process is then separated from the condensation reaction mixture by the addition of water. This causes a phase separation forming a layer of the organic sulfur product and an aqueous layer containing by-product sodium halide, excess condensing agent, and much of the alcohol. The oily layer is drawn off and thoroughly washed with water. In many cases, however, the separation is more effective by adding a low boiling hydrocarbon solvent, such as pentane, to the reaction mixture along with the water. The product and solvent solution after further water washing is dried and freed of any dispersed solids by filtering through diatomaceous earth, clay or like materials. The hydrocarbon solvent, along with any other low boiling constituents are removed by vacuum evaporation to obtain the final product, an oil soluble organic polysulfide.

The principles and practice of my invention are illustrated by the examples which follow:

EXAMPLE I

A series of four nonene-$S_2Cl_2$ reactions were made wherein the effect upon the reactions by alcohol catalysis and the order of combining the reactants was observed. The apparatus consisted of a one-liter 3-necked glass flask cooled by a water-ice bath and fitted with dropping funnel, stirrer, thermometer, and a gas outlet connected to a caustic scrubber for absorbing evolved hydrogen chloride. In that apparatus, several runs were made where the amounts of nonene (propylene polymer), boiling point 128–42° C., 1.07 double bonds per mole, and sulfur monochloride were 126 grams (1.0 mole) and 70.9 grams (0.525 mole), respectively. Where the catalyst was used, 5 ml. Formula 30 alcohol was mixed with the nonene. The time taken for combining the reactants in each of the four runs was 30 minutes with temperature held at 20–25° C., after which the reaction mixture was stirred for 30 minutes more at 25° C. During the course of each run, a slight vacuum was applied to the caustic scrubber to insure removal of evolved HCl from the reaction flask.

The results for the four nonene-$S_2Cl_2$ runs are shown in the following Table I:

Table I

| Order of Combining Reactants | Alcohol Catalyst, Percent of Nonene | Reaction Induction Delay | Equivalents of HCl evolved | Color of Addition Product |
|---|---|---|---|---|
| 1. $S_2Cl_2$ to nonene | 0 | until 0.4 of $S_2Cl_2$ added in. | 0.250 | Medium Red. |
| 2. $S_2Cl_2$ to nonene | 3.2 | None | 0.121 | Medium Orange. |
| 3. Nonene to $S_2Cl_2$ | 0 | Slight | 0.210 | Cherry Red. |
| 4. Nonene to $S_2Cl_2$ | 3.2 | None | 0.188 | Light Orange. |

The foregoing results show clearly that a catalytic amount of alcohol improved the quality and the stability against HCl loss of the intermediate olefin-$S_2Cl_2$ addition product. Furthermore, run 4 demonstrates that adding the olefin plus catalyst to a charge of sulfur halide is much to be preferred in order to produce the most desirable intermediate for subsequent condensation to greatest yield and purities of final product.

To each of the four intermediates prepared above, there was added a solution consisting of 239 grams of 40 per cent aqueous $Na_2S_4$ (0.55 mole, 10 per cent excess based on olefin charged) and 175 ml. Formula 30 alcohol. Each mixture was reacted two hours at reflux boiling, 76–78° C. The products were phase separated by the addition of 250 ml. water to each reacted mixture and dried by filtering through clay. The condensation product from the intermediate of run 4 (see Table I above) was the more homogeneous and viscous, yet oily, of all. It was more dense than its aqueous reaction phase and an assist with pentane extraction of the reaction mixture before filtration was needed for its complete recovery. Examination of the four products showed that the conditions of run 4 are representative of my improved process for securing the desired product, analysis of which after removal of small amounts of unreacted olefin by vacuum evaporation showed that it contained slightly more than the theoretical amount of sulfur, i. e., 44.9 per cent, required to give a sulfur/olefin ratio of 3 atoms of sulfur per mole of olefin reacted. Only trace residual chlorine was found. This product is a cherry red viscous oil-soluble compound.

EXAMPLE II

An addition reaction betwen nonene and $S_2Cl_2$ was conducted with subsequent condensation of the resulting intermediate with $Na_2S_4$. The reactor used consisted of a glass vessel fitted with a drip inlet, agitator, thermometer, and an outlet to an HCl absorber. The reaction temperature was controlled by a water-ice bath surrounding the reactor. To start with, a charge of 35.5 grams (0.26 mole) $S_2Cl_2$ was placed in the reactor. Into this charge there was dripped a mixture of 63 grams (0.50 mole) of nonene (propylene polymer) and 2.7 ml. (3.5 weight per cent of the nonene) of Formula 30 ethyl alcohol; dripping time was 30 minutes, and the temperature was held at 15–20° C. The reaction mixture was stirred for 45 minutes longer at the same temperature. There was no induction delay in the reaction. Some hydrogen chloride was evolved and it amounted to 0.094 mole. The chlorononylsulfide intermediate thus formed is a light orange colored oil.

When the catalyst is absent from the foregoing reaction but which is otherwise conducted in the same way, an appreciably greater amount of hydrogen chloride is evolved and a much darker and red-colored product is produced.

Continuing with the second part of the process, 130.5 grams of a 40 per cent $Na_2S_4$ (0.3 mole) aqueous solution and 100 ml. Formula 30 ethyl alcohol (53 volume per cent of total solvent) were added to the freshly prepared intermediate produced by the catalyzed addition reaction. This mixture was then heated under reflux (about 80° C.) for 3 hours. The final product, a clear light red somewhat viscous and oil soluble compound, was isolated from its reaction mixture by the addition of 150 ml. water; it separated as a bottom layer more dense than water. The product was drawn off, water washed once, and dried by filtering through clay; 75.2 grams were thus obtained. Analysis of the product showed 43.4 per cent sulfur corresponding to 3 atoms per mole of nonene converted. Vacuum evaporated volatile matter (at 3 mm. Hg and 100° C.), mostly unreacted nonene, amounted to about 5 per cent of the product.

When the foregoing condensation reaction was repeated using the nonene-$S_2Cl_2$ intermediate prepared without the catalyst, the finished product therefrom contained 38.9 per cent sulfur; and 12 per cent of vacuum volatile unreacted nonene. The product was also much darker in color.

When the condensation step of my process is deficient in alcohol, a product low in sulfur and containing a considerable amount of halogen is produced. For example, I found that when the solvent for the reaction contained 23.9 volume per cent of ethyl alcohol rather than the effective 53 per cent in the procedure described above, the product which resulted contained 5.25 per cent chlorine and only 25.7 per cent sulfur. When no alcohol is used, the resulting product is much the same. As already noted, the minimum solvent requirement of alcohol for effective condensation is about 40 per cent.

EXAMPLE III

Isopropyl alcohol was found to be a useful catalyst in the synthesis of the products of this invention, and especially so when it contained relatively small amounts of water comparable with that present in the commercial denatured ethyl alcohols. In accordance with the reaction conditions of Example I, run 4, a mixture of nonene with 5 per cent isopropyl alcohol (5 per cent water therein) was reacted with sulfur monochloride. The intermediate thus formed when condensed with alcoholic-aqueous $Na_2S_4$ also in the manner of Example I similarly gave a cherry red oily product containing 40.3 per cent sulfur and about 6 per cent of a vacuum volatile component, principally unreacted nonene.

In another run when anhydrous isopropyl alcohol in like amount was used as the catalyst, a like appearing final product was obtained which contained 38.3 per cent sulfur. The vacuum volatile component in this case amounted to about 11 per cent by weight. It is apparent, therefore, that in some instances the effect of the catalyst in the process is enhanced by the presence of very small amounts of water.

EXAMPLE IV

A mixture of 112 grams of octene-1 (boiling point 126° C., prepared by dehydration of n-octyl alcohol) and 5 ml. Formula 30 alcohol (3.6 weight per cent of the octene) was added dropwise during 15 minutes with stirring to 68 grams $S_2Cl_2$ placed in the apparatus described in Example I. The reaction was initiated at 20° C. Since the heat of reaction in this case was low and the evolution of hydrogen chloride was so very slight, the temperature was brought to 50° C. for 25 minutes more. Only 0.074 mole of hydrogen chloride was evolved in this reaction. The intermediate thus formed was a very light orange colored oily liquid. Shortly after formation of the intermediate, there was added to it 239 grams of 40 per cent $Na_2S_4$ aqueous solution and 175 ml. of Formula 30 alcohol. The mixture was reacted two hours with heating and stirring under reflux at about 80° C. Then 250 ml. of water were stirred into this reaction mixture. The batch was transferred to a separatory funnel wherein the final organic product settled out and was drawn off as a cloudy yellow viscous liquid. The aqueous residue and apparatus used were washed with 250 ml. of pentane for recovery of entrained products. The combined solution of the product and the pentane washings were filtered through clay. After evaporating the solvent from the filtrate, there was obtained 187 grams of product, very viscous and light-amber colored. This product contained by analysis 44.5 per cent sulfur and about 2.3 per cent of a vacuum volatile component (3 mm. Hg @ 100° C.) The theoretical sulfur content based on 3 atoms sulfur per mole of octene converted is 46.1 per cent.

Had the alcohol been omitted from the olefin-$S_2Cl_2$ addition, then considerable darkening and tarring of the intermediate occurs with consequent losses thereof and the final product of the process becomes an inhomogeneous sulfur-deficient mixture.

EXAMPLE V

When sulfur dichloride, $SCl_2$, is reacted with nonene in place of sulfur monochloride and in accordance with the procedure of Example I, run 4, an intermediate is formed containing approximately one half of the amount of sulfur that is obtained from intermediates formed from sulfur monochloride. However, when the condensation step of my process is applied to such sulfur-low intermediates, final products are produced containing substantially the same amount of sulfur as from the use of sulfur monochloride. For instance, an $SCl_2$ product was obtained containing 36.1 per cent sulfur and 0.24 per cent chlorine. This, when topped by vacuum evaporation (50 minutes at 3 mm. Hg and 100° C.), removed light constituents and gave a final product containing about 44 per cent sulfur. The apparent explanation is that $Na_2S_4$ under my condensation conditions will add sulfur to the organic monosulfide bridge produced by the addition of $SCl_2$ to two olefin double bonds.

EXAMPLE VI

This example is given to illustrate the production of a useful product of this invention from a charge of mixed olefins, a product that was isolated from its final reaction mixture by the use of a mineral oil to give a concentrated solution of the product therein. The source of mixed olefins used was a recycle feed stock of propylene polymerization having the following composition:

|  | Weight per cent |
|---|---|
| Pentanes | 5.9 |
| Hexenes | 25.4 |
| Nonenes | 68.7 |
|  | 100.0 |

One hundred twelve grams of this olefinic material containing 105 grams (0.91 av. mole) unsaturates were mixed with 5 ml. Formula 12 ethyl alcohol and placed in a glass reactor the same as employed in the foregoing examples. To this olefin charge, 67.5 grams (0.5 mole) of $S_2Cl_2$ were added dropwise with stirring during 30 minutes, and stirring thereafter for another 30 minutes. The reaction temperature was held at 50° C. by an initial cooling bath but required some heating to keep this temperature in the last half of the reaction. During the reaction, the pentanes originally present vaporized out of the reaction together with a small amount of hydrogen chloride. The addition product thus formed was then heated under reflux for 3 hours with a combined solution of 230 grams of an aqueous solution containing 40 per cent of $Na_2S_4$ (0.53 mole) and 125 ml. of Formula 12 ethyl alcohol. The product was phase separated from the reaction mixture by the addition of 250 ml. of water and 170 ml. (144 grams) of 100 pale oil with stirring for 5 minutes. After standing 15 minutes, the mixture broke cleanly into two layers. The top product-oil solution which contained all of the organic reaction product was drawn off and filtered through clay. Thus there was obtained 308 grams of a red solution containing 164 grams (about 85 per cent of theoretical) of the sulfur-containing organic product. Analysis of the product solution showed 22.3 per cent sulfur which when calculated to pale-oil-free basis amounted to 41.8 per cent (theoretical value being 45.3 per cent). The reaction product, therefore, contained sulfur amounting to slightly less than 3 atoms per mole of olefins reacted. This difference indicates the presence of a small amount of unreacted olefin, but of no detriment to the usefulness of the pale oil concentrate produced. Residual chlorine was present in the product in only trace amounts.

EXAMPLE VII

A hexene isomer fraction boiling between 55–75° C. to which had been added 4 ml. Formula 30 alcohol was reacted with sulfur monochloride in the proportions of 84 grams (1.0 mole) hexene added dropwise in 15 minutes to 50.9 grams (0.52 mole) $S_2Cl_2$ with agitation. The temperature was held at 20–25° C. during addition of the hexene by a cooling bath and kept there while the reacting mixture was stirred for 30 minutes more. The reaction evolved 0.09 mole of HCl. The intermediate obtained was an orange-colored transparent oil. To it there was added 96 grams (0.55 mole) $Na_2S_4$ dissolved in 318 cc. of an alcoholic-aqueous solvent containing 55 per cent by volume of Formula 30 alcohol. This mixture was held at 60–65° C. for 2 hours after which 250 ml. of water was added with stirring. On standing, the condensation product settled as a bottom layer, was then drained off, and filtered through diatomaceous earth. Upon vacuum evaporation by holding 25 minutes at 45° C. and 3 mm. Hg pressure to remove a small amount of unreacted hexene, a light viscous compound, soluble in mineral oil, was obtained. It analyzed for 55.4 per cent sulfur and a trace of chlorine. The theoretical sulfur content for this compound is 53.3 per cent by weight, or 3 atoms of sulfur per mole of hexene. The difference is accounted for by the presence of a small amount of dissolved free sulfur formed by hydrolytic decomposition of excess $S_2Cl_2$ in the condensation reaction.

EXAMPLE VIII

Dodecene produced by the polymerization of propylene is another example of an olefin suitable as a raw material in the practice of my invention. Accordingly, 0.52 mole $S_2Cl_2$ (69.9 grams) was added to one mole dodecene (168 grams) containing 5 ml. Formula 30 alcohol during 30 minutes while keeping the reaction temperature at 20–25° C., which was held during stirring for another 30 minutes. This highly branched olefin gives a somewhat unstable addition product; this was evidenced by the evolution of 0.28 mole of hydrogen chloride. However, as will be seen from the subsequent condensation with sodium tetrasulfide, a satisfactory high sulfur end product is obtained. The intermediate immediately after formation was reacted at 80° C. with 230 grams of 40 per cent $Na_2S_4$ aqueous solution and 125 ml. Formula 12 alcohol (47.5 per cent by volume of the combined solvents) during 3 hours. The product was isolated as a concentrated lube oil solution by adding 143 grams of 100 pale oil to the reaction mixture, thoroughly agitating the mixture which then separated into two layers, the top one being the oil-product solution. During this separation operation, 16 grams of free sulfur precipitated into the aqueous-alcoholic layer. The aqueous bottom layer was drained off. The product-oil solution was dried by filtering through diatomaceous earth and after vacuum evaporation by holding 25 minutes at 100° C. under 3 mm. Hg pressure, a finished solution containing 55.7 per cent by weight of the dodecene-sulfur compound was obtained. The oil-solution analyzed for 18.7 per cent sulfur, which on an oil-free basis amounts to 36 per cent by weight of the organic sulfur compound produced. This sulfur content corresponds practically to 3 atoms of sulfur combined per mole of the dodecene. Only a trace of chlorine remained in the product.

EXAMPLE IX

In the production of compounds from olefins which are to contain about but not less than 2 atoms of sulfur per mole of the olefin used, the addition product of the olefin and sulfur halide is condensed with an inorganic trisulfide in an alcoholic-aqueous reaction mixture by proceeding as follows:

A batch of nonene-$S_2Cl_2$ intermediate product was first prepared according to Example II, first paragraph. An aqueous solution of sodium trisulfide, $Na_2S_3$, was previously prepared by heating a mixture of 89.4 grams of 60 per cent sodium sulfide, 44 grams of sulfur, and 144 grams of water at 100° C. for 45 minutes and letting the resulting clear red solution stand tightly stoppered for about 60 hours before using. Two hundred twenty-two grams of this solution containing 0.55 mole of $Na_2S_3$, and 175 cc. of Formula 30 alcohol were mixed with 189 grams (0.49 mole) of the nonene-$S_2Cl_2$ intermediate, and the mixture then reacted by heating under refluxing at 78–80° C. for 3 hours. The product was isolated by the addition of 250 cc. of water. The mixture was thoroughly agitated and let stand and the product phase separated to form the top layer. This layer was drawn off and dried by clay filtration. A cherry red slightly viscous product was obtained. On vacuum evaporation of volatile components, chiefly unreacted nonene, a final product was obtained which contained 36.2 per cent sulfur and only a trace of chlorine. The amount of sulfur present corresponds to 2.23 atoms per mole of nonene reacted.

EXAMPLE X

A pure branched chain $C_8$ olefin, 2-ethyl hexene-1, prepared from the corresponding alcohol by dehydration was used as a raw material for my process. The reactor for this run consisted of a 1-liter, 3-necked flask, equipped for both cooling or heating, and fitted with stirrer, thermometer, condenser, and dropping funnel. Into this flask there was placed a charge of 0.525 mole (71 grams) of $S_2Cl_2$. One mole (112 grams) of the above olefin which had been mixed with 5 ml. Formula 30 alcohol was added through the dropping funnel as rapidly as the control of the reaction temperature between 20–30° C. would permit. Getting all of the ethyl hexene into the reactor took 17 minutes. The reaction mixture thus formed was stirred for 30 minutes, at which time 240 grams of aqueous 40 per cent $Na_2S_4$ (0.55 mole) and 175 ml. Formula 30 alcohol was poured into it. The resulting mixture was refluxed by heating at 78° C. for 3 hours during which the condensation reaction was completed. The product was phase-separated therefrom by adding and mixing 350 ml. of hot water. The organic layer was drawn off and filter-dried through clay. The remaining aqueous layer, the reaction flask, and the product filter were washed with pentane to complete the total recovery of the product. The pentane washings were steam evaporated and the product thus recovered was combined with the main portion earlier obtained. A trace of free sulfur was produced in the process. The product, a dark red viscous compound soluble in mineral oil, was found upon analysis to contain 44.7 per cent sulfur (2.80 atoms per mole of olefin reacted) and 0.6 per cent chlorine. The theoretical sulfur content for this product is 46.5 per cent. The product yield was 95 per cent of the theoretical amount.

EXAMPLE XI

The processing of 2-ethyl hexene-1 was identically repeated according to Example X except that 0.525 mole (54.1 grams) of $SCl_2$ was used in place of $S_2Cl_2$. The dark red oily compound, soluble in mineral oil, was found to contain 39.5 per cent sulfur corresponding to 2.24 atoms per mole of the olefin reacted and 1.9 per cent chlorine. The product yield was 87 per cent of the theoretrical amount.

EXAMPLE XII

Cyclohexene, an example of an olefin yielding a final product of limited solubility was processed by the reagents and procedure described in Example X. Certain differences were noted, however. Soon after the condensation reaction had progressed, the product thereof began depositing as a viscous gel. Since it was insoluble in pentane but was soluble in benzene, the latter solvent was used in working up the final reaction mixture for recovery of product. By analysis, this product contained 52.8 per cent sulfur (theoretical 53.9 per cent) and 0.9 per cent chlorine. The product is light yellow, solid at room temperature, and its sulfur stands in the proportion of 2.9 atoms per mole of the cyclohexene reacted. Yield was about 90 per cent of theory.

EXAMPLE XIII

This example demonstrates a semi-commercial operation of my process for the conversion of an olefin to a desired product useful in cutting oil compositions. The equipment consisted of two 300-gallon capacity steel reactors operating at atmospheric pressure and equipped with side entry agitators, reflux condensers, and thermocouples. The olefin employed was nonene, a propylene polymer of boiling range 128–151° C. and gravity 58.5° A. P. I.

The process was begun by charging the first reactor with 100 gallons (620 lbs.) nonene and 3 gallons Formula 12 denatured alcohol. The temperature of the charge was 28° C. Then 28 gallons (395 lbs.) of sulfur monochloride (commerical grade) was added during a period of 2 hours, rapidly stirring the while. The heat of reaction was dissipated by continuously adding granulated dry ice to the reacting mixture along with the sulfur monochloride; 600 lbs. were used and the temperature of the reaction was thus kept between 18–29° C. The reaction was completed by vigorously stirring for 30 minutes after the sulfur monochloride had been added, finishing off at 30° C.

To the intermediate thus formed there was rapidly added 120 gallons (1335 lbs.) of an aqueous solution containing 40 per cent $Na_2S_4$. The mixture was stirred to homogeniety in 5 minutes and one half of it pumped into the second reactor. Into each batch mixture thus formed, there was immediately poured 45 gallons of Formula 12 denatured alcohol while stirring and heating by means of steam coils to 78–83° C., after which the mixture cooled slightly and was kept for 3 hours at 72° C. Thus the condensation reaction was completed to produce a product which I have termed a "nonene polysulfide."

The product was separated from its final reaction mixture as a concentrate in mineral oil by adding to each batch 75 gallons of water and 100 gallons of 100 pale lube oil stock. The mixtures were stirred thoroughly for 10 minutes and then let stand to settle out over night, at which time the oil-product which had formed its own layer was drawn off. A small amount of free sulfur had formed and it had settled with the aqueous layer.

The separated oil-product solution was then let stand for one week to settle out additional by-product free surfur and was filtered through clay for drying and removal of dispersed solids. The filtered product-oil solution was topped in a 50-gallon still to remove residual unreacted nonene. Volatile matter thus removed amounted to about 9 per cent of the still charge.

The finished pale oil concentrate containing approximately 50 per cent by weight of the "nonene polysulfide" analyzed for 20.3 per cent sulfur and 0.46 per cent chlorine. On pale-oil free basis, the product contained 40.6 per cent by weight of sulfur and 0.92 per cent by weight of chlorine. The yield amounted to about 90 per cent based on nonene charged.

EXAMPLE XIV

This example demonstrates the applicability of a wax-olefin in accordance with my invention. The wax olefin selected had been produced from a petroleum wax by the chlorination-dehydrochlorination process. Its characterizing properties were as follows:

Molecular weight_____ 380.
Unsaturated bonds per mole____ 1.74 (not conjugated).
Residual chlorine_____ 0.62%.

To a stirred charge of 436 grams (1.15 moles containing 2 moles of unsaturation) of this wax olefin in a glass reactor, there were added 142 grams (1.05 moles) of sulfur monochloride dropwise during 90 minutes; the temperature of reaction was kept at 25–30° C. by externally applied cooling. A considerable amount of hydrogen chloride was evolved which is generally characteristic of so high a molecular weight olefin. The intermediate product thus formed was quite viscous. To 183 grams of this intermediate there was added 400 cc. of Formula 30 alcohol and 214 grams of an aqueous solution containing 85.6 grams $Na_2S_4$. The reaction mixture was then heated to boiling at 79° C. and kept at reflux until completion of the reaction. Upon cooling, a very viscous gel-like product settled out. It was thoroughly water washed and further purified by solvent extraction in turn with alcohol, acetone, and naphtha. The final product thus obtained was found to be permanently soluble to at least a 10 per cent concentration in an S. A. E. 20, 95 V. I. lube oil, although heating was required to bring it into solution. Analysis of the product gave 19.5 per cent sulfur and 0.88 per cent chlorine. With regard to this chlorine, it is to be noted that most of it can be accounted for by the chlorine originally contained in the wax olefin. The amount of sulfur present in the condensation product corresponds to 2.87 atoms of sulfur per mole of the wax olefin, thus it is again apparent that in my process substantially all the chlorine which adds to the olefin from the sulfur chloride is removed and replaced by sulfur.

EXAMPLE XV

A mutual solvent consisting of isopropyl alcohol and water was found effective in the condensation of an olefin-sulfur chloride intermediate when a run was made according to the following description:

A charge of 70.9 grams (0.525 mole) sulfur monochloride was placed in the glass reactor described in Example I and while stirring, a mixture of 126 grams (1.0 mole) nonene ($C_3$ polymer) and 5 ml. denatured ethyl alcohol was added dropwise during 9 minutes. The ensuing exothermic reaction was held between 17–20° C. by a water-ice bath. The reaction mixture was then stirred at room temperature for 30 minutes more.

There was at once added to the intermediate thus formed 240 grams of 40 per cent aqueous $Na_2S_4$ (0.55 mole) followed by adding 175 ml. isopropyl alcohol. This mixture was heated at reflux for 3 hours under atmospheric pressure to form the final product. The product was separated from its reaction mixture by adding about 300 ml. hot water, stirring for a few minutes, and letting aqueous and product layers separate. The lower product layer was drawn off and filtered through diatomaceous earth. The filter coke, apparatus, and aqueous layer were twice washed with n-pentane. This solvent solution was evaporated to recover residual product which was combined with the first recovered product layer. The yield of oil soluble product, a dinonyl polysulfide, thus produced amounted to 80 per cent. Analysis showed 36.2 per cent sulfur and 0.5 per cent chlorine. The ratio of $S/C_9=2.25$.

EXAMPLE XVI

A mutual solvent consisting of mixed alcohols and water was found effective for the condensation treatment of the olefin-sulfur chloride intermediate.

Accordingly, nonene ($C_3$ polymer) plus 3.24 weight per cent denatured ethyl alcohol was reacted with sulfur monochloride to form the intermediate which was then condensed with sodium tetrasulfide in the same proportions of reactants and conditions as described in the preceding Example XV. In this run, the mutual solvent for the treatment with sodium tetrasulfide contained 175 ml. of a mixture of equal volumes of methyl alcohol and isopropyl alcohol. An oil soluble dinonyl polysulfide product amounting to about 78 per cent of the theoretical yield containing 39.5 per cent sulfur and 0.5 per cent chlorine was obtained. The $S/C_9$ ratio=2.57.

EXAMPLE XVII

Ammonium polysulfide was found effective as the reagent for condensing the olefin-sulfur chloride intermediate.

Nonene in the amount of 126 grams (1.0 mole) to which had been added 5 ml. denatured ethyl alcohol was added dropwise during 21 minutes to 70.9 grams (0.525 mole) sulfur monochloride with the reaction temperature held at 15–20° C. This reaction was completed by stirring the reaction mass for 30 minutes more.

The ammonium polysulfide with which the intermediate was at once reacted was prepared shortly before use by adding 70.9 grams sulfur to 200 ml. 15 N. ammonium hydroxide and slowly bubbling hydrogen sulfide into this mixture while keeping the reaction cooled with tap water and until the sulfur had become dissolved to form a dark red solution containing approximately 1.5 moles of the ammonium higher polysulfide.

The aqueous ammonium polysulfide solution thus prepared and 200 ml. denatured ethyl alcohol (Formula 30) were added to the nonene-sulfur monochloride intermediate at room temperature. The mixture was stirred and heated to reflux where it was kept for 3 hours. During the reaction some ammonia and hydrogen sulfide was evolved as evidenced by solid ammonium sulfide depositing in the upper portion of the reflux condenser.

The oil soluble final condensation product, isolated as described in Example XV, amounted to 71 per cent of theoretical yield and by analysis it contained 37.0 per cent sulfur and 0.74 per cent chlorine. The $S/C_9$ ratio=2.3.

It will be noted from the foregoing examples that a wide variety of dialkyl polysulfide compounds can be produced wherein the ratio of sulfur to the alkyl group in such compounds can be held substantially constant. One advantage of this in the application of the products of this invention, for example, is in the preparation of cutting oil compositions for various purposes where the molecular concentration of the compound in a given oil base may be kept constant while the sulfur content of such solution can be varied at will depending on the selection of the proper molecular weight olefin with which the sulfur is combined.

I have disclosed compounds of this invention which contain sulfur in the proportion of from 2 to about 3 atoms per mole of olefin combined therewith. The use of the inorganic trisulfides in the condensation reaction approaches the value of 2; the tetrasulfides and higher generally produce the 3-atom sulfur compounds.

Molecular weight determinations (benzene freezing point method) of the various compounds produced according to my invention have shown them to be approximately twice the molecular weight of the olefin used plus the atom weights of the sulfur which has been combined therewith. For example, a product produced from nonene and containing 39.3 weight per cent of sulfur corresponding to 5 atoms of sulfur for 2 moles of the olefin, was found to have a molecular weight of 420. This value stands in experimentally good agreement with the theoretical molecular weight of 412. Infrared absorption spectrograms have shown my products to be substantially free from C=C unsaturation.

It is believed from the course of the process reactions and the foregoing analytical observations that the compounds produced by reacting olefins with a sulfur halide and an inorganic higher polysulfide according to the process of my invention, are constituted of two saturated organic radicals joined together by two sulfur bridges. For example, a theoretical representation of the structure is as follows:

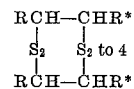

wherein R = a hydrocarbon radical, and R* may be either hydrogen or a hydrocarbon radical.

The foregoing examples are illustrative of the practice of my invention and are not intended to be interpreted in limitation thereof; the scope of my invention based upon the intent and meaning of my disclosures is defined by the terms of the claims appended hereto.

I claim as my invention:

1. The method of producing substantially saturated oil soluble organic polysulfides comprising the steps, reacting a nonconjugated olefinic hydrocarbon having from at least six to about 30 carbon atoms with about a stoichiometric equivalent of a sulfur halide in the presence of a catalytic amount of a low molecular weight aliphatic alcohol at a temperature of from about 0° C. to about 50° C. for a time not exceeding about three hours sufficient to form a di(halo alkyl) sulfur intermediate, but insufficient to effect dehydrohalogenation as evidenced by the substantial splitting out of hydrogen halide, then at once condensing this intermediate with a water-soluble inorganic higher polysulfide at about 50–100° C., in a mutual solvent for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin.

2. The method of producing substantially saturated oil soluble organic polysulfides comprising the steps, reacting a nonconjugated olefinic hydrocarbon having from at least six to about 30 carbon atoms with about a stoichiometric equivalent of a sulfur halide in the presence of a catalytic amount of a low molecular weight alcohol at a temperature of from about 0° C. to about 50° C. for a time not exceeding about three hours sufficient to form a di(halo alkyl) sulfur intermediate, but insufficient to effect dehydrohalogenation as evidenced by the substantial splitting out of hydrogen halide, then at once condensing this intermediate with a water-soluble inorganic higher polysulfide at about 50–100° C., in a mutual solvent of which a substantial proportion is an aqueous solution of an organic oxygen compound, for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin.

3. The method of producing substantially saturated oil soluble organic polysulfides comprising the steps, reacting a nonconjugated olefinic hydrocarbon having from at least six to about 30 carbon atoms with about a stoichiometric equivalent of a sulfur halide in the presence of a catalytic amount of a low molecular weight alcohol at a temperature of from about 0° C. to about 50° C. for a time not exceeding about three hours sufficient to form a di (halo alkyl) sulfur intermediate, but insufficient to effect dehydrohalogenation as evidenced by the substantial splitting out of hydrogen halide, then at once condensing this intermediate with a water-soluble inorganic higher polysulfide at about 50-100° C., in a mutual solvent of which a substantial proportion is an aqueous solution of an organic hydroxy compound, for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin.

4. The method of producing substantially saturated oil soluble organic polysulfides comprising the steps, reacting a nonconjugated olefinic hydrocarbon having from at least six to about 30 carbon atoms with about a stoichiometric equivalent of a sulfur halide in the presence of a catalytic amount of a low molecular weight alcohol at a temperature of from about 0° C. to about 50° C. for a time not exceeding about three hours sufficient to form a di (halo alkyl) sulfur intermediate, but insufficient to effect dehydrohalogenation as evidenced by the substantial splitting out of hydrogen halide, then at once condensing this intermediate with a water-soluble inorganic higher polysulfide at about 50–100 C., in a mutual solvent of which a substantial proportion is an aqueous solution of an alcohol, for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin.

5. The method of producing substantially saturated oil soluble organic polysulfides comprising the steps, reacting a nonconjugated olefinic hydrocarbon having from at least six to about 12 carbon atoms with about a stoichiometric equivalent of a sulfur halide in the presence of a catalytic amount of a low molecular weight alcohol at a temperature of from about 0° C. to about 50° C. for a time not exceeding about three hours sufficient to form a di (halo alkyl) sulfur intermediate, but insufficient to effect dehydrohalogenation as evidenced by the substantial splitting out of hydrogen halide, then at once condensing this intermediate with a water-soluble inorganic higher polysulfide at about 50–100° C., in a mutual solvent for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin.

6. The method of producing substantially saturated oil soluble organic polysulfides comprising the steps, reacting a non-conjugated olefinic hydrocarbon polymer having from at least six to about 12 carbon atoms with about a stoichiometric equivalent of a sulfur halide in the presence of a catalytic amount of a low molecular weight alcohol at a temperature of from about 0° C. to about 50° C. for a time not exceeding about three hours sufficient to form a di(halo alkyl) sulfur intermediate, but insufficient to effect dehydrohalogenation as evidenced by the substantial splitting out of hydrogen halide, then at once condensing this intermediate with a water-soluble inorganic higher polysulfide at about 50–100° C., in a mutual solvent for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin.

7. The method of producing substantially saturated oil soluble organic polysulfides comprising the steps, reacting a non-conjugated olefinic poly-propylene having from at least six to about 12 carbon atoms with about a stoichiometric equivalent of a sulfur halide in the presence of a catalytic amount of a low molecular weight alcohol at a temperature of from about 0° C. to about 50° C. for a time not exceeding about three hours sufficient to form a di(halo alkyl) sulfur intermediate, but insufficient to effect dehydrohalogenation as evidenced by the substantial splitting out of hydrogen halide, then at once condensing this intermediate with a water-soluble inorganic higher polysulfide at about 50–100° C., in a mutual solvent for a time not to exceed about 4 hours and upon completion of the condensation reaction separating the product, thus forming an organic polysulfide which is substantially a dimer of thre reactant olefin and having combined therewith from at least 2 to about 3 atoms of sulfur per unsaturated linkage in the reactant olefin.

8. The method of producing substantially saturated oil soluble organic polysulfides comprising the steps, reacting a non-conjugated olefinic hydrocarbon having from at least six to about 30 carbon atoms with about a stoichiometric equivalent of a sulfur chloride in the presence of a catalytic amount of a low molecular weight alcohol at a temperature of from about 0° C. to about 50° C. for a time not exceeding about three hours sufficient to form a di(chloro alkyl) sulfur intermediate, but insufficient to effect dehydrohalogenation as evidenced by the substantial splitting out of hydrogen chloride, then at once condensing this intermediate with a water-soluble inorganic higher polysulfide at about 50–100° C., in a mutual solvent for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin.

9. The method of producing substantially saturated oil soluble organic polysulfides comprising the steps, reacting a non-conjugated olefinic hydrocarbon having from at least six to about 30 carbon atoms with about a stoichiometric equivalent of sulfur monochloride in the presence of a catalytic amount of low molecular weight alcohol at a temperature of from about 0° C. to about 50° C. for a time not exceeding about three hours sufficient to form a di(chloro alkyl) sulfur intermediate, but insufficient to effect dehydrohalogenation as evidenced by the substantial splitting out of hydrogen chloride, then at once condensing this intermediate with a water-soluble inorganic higher polysulfide at about 50–100° C., in a mutual solvent for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin.

10. The method of producing substantially saturated oil soluble organic polysulfides comprising the steps, reacting a non-conjugated olefinic hydrocarbon having from at least six to about 30 carbon atoms with about a stoichiometric equivalent of a sulfur halide in the presence of a catalytic amount of a low molecular weight alcohol at a temperature of from about 0° C. to about 50° C. for a time not exceeding about three hours sufficient to form a di(halo alkyl) sulfur intermediate, but insufficient to effect dehydrohalogenation as evidenced by the substantial splitting out of hydrogen halide, then at once condensing this intermediate with a water-soluble alkali metal higher polysulfide at about 50–100° C., in a mutual solvent for a time not to exceed about 4 hours and upon completion of the condensation reaction separating the product, thus forming an organic polysulfide which is substantally a dimer of the reactant olefin and having combined therewith from at least 2 to about 3 atoms of sulfur per unsaturated linkage in the reactant olefin.

11. The method of producing substantially saturated oil soluble organic polysulfides comprising the steps, reacting a non-conjugated olefinic hydrocarbon having from at least six to about 30 carbon atoms with about a stoichiometric equivalent of a sulfur halide in the presence of a catalytic amount of a low molecular weight alcohol at a temperature of from about 0° C. to about 50° C. for a time not exceeding about three hours sufficient to form a di(halo alkyl) sulfur intermediate, but insufficient to effect dehydrohalogenation as evidenced by the substantial splitting out of hydrogen halide, then at once condensing this intermediate with sodium polysulfide containing an average of about 4 atoms of sulfur per molecule at about 50–100° C., in a mutual solvent for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin.

12. The method of producing substantially saturated oil soluble organic polysulfides comprising the steps, reacting a non-conjugated olefinic hydrocarbon having from at least six to about 30 carbon atoms with about a stoichiometric equivalent of a sulfur halide in the presence of a catalytic amount of a low molecular weight alcohol at a temperature of from about 0° C. to about 50° C. for a time not exceeding about three hours sufficient to form a di(halo alkyl) sulfur intermediate, but insufficient to effect dehydrohalogenation as evidenced by the substantial splitting out of hydrogen halide, then at once condensing this intermediate with a water-soluble inorganic higher polysulfide in a mutual solvent at about the reflux temperature of said solvent for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin.

13. The method of producing substantially saturated oil soluble organic polysulfides comprising the steps, reacting a non-conjugated olefinic poly-propylene having from at least six to about 12 carbon atoms with about a stoichiometric equivalent of sulfur monochloride in the presence of a catalytic amount of a low molecular weight aliphatic alcohol at a temperature of from about 0° C. to about 50° C. for a time not exceeding about three hours sufficient to form a di(chloro alkyl) sulfur intermediate, but insufficient to effect dehydrohalogenation as evidenced by the substantial splitting out of hydrogen chloride, then at once condensing this intermediate with a water-soluble alkali metal higher polysulfide in a mutual solvent of which a substantial proportion is an aqueous solution of an alcohol at about the reflux temperature of said solvent, for a time not to exceed about 4 hours and upon completion of the condensation reaction separating the product, thus forming an organic polysulfide which is substantially a dimer of the reactant olefin and having combined therewith from at least 2 to about 3 atoms of sulfur per unsaturated linkage in the reactant olefin.

References Cited in the file of this patent

UNITED STATES PATENTS

| | | |
|---|---|---|
| 2,067,465 | ter Horst | Jan. 12, 1937 |
| 2,102,564 | Bonstein | Dec. 14, 1937 |
| 2,346,157 | Farrington et al. | Apr. 11, 1944 |
| 2,348,080 | Lincoln et al. | May 2, 1944 |
| 2,497,138 | Rogers | Feb. 14, 1950 |

OTHER REFERENCES

Whitmore: "Oreg. Chem." (1951), 2nd ed., p 33.